(12) United States Patent
Raymond et al.

(10) Patent No.: US 12,210,172 B2
(45) Date of Patent: *Jan. 28, 2025

(54) DIFFUSER COMBINING A MULTI-FACETED SURFACE AND A LENS-COVERED SURFACE TO PROVIDE SPECIFIC LIGHT DISTRIBUTIONS

(71) Applicant: LUMENCO, LLC, Englewood, CO (US)

(72) Inventors: Mark A. Raymond, Englewood, CO (US); Hector Andres Porras Soto, Englewood, CO (US); Howard Lange, Englewood, CO (US)

(73) Assignee: LUMENCO, LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/547,858

(22) PCT Filed: Feb. 18, 2022

(86) PCT No.: PCT/US2022/017065
§ 371 (c)(1),
(2) Date: Aug. 24, 2023

(87) PCT Pub. No.: WO2022/182597
PCT Pub. Date: Sep. 1, 2022

(65) Prior Publication Data
US 2024/0125983 A1 Apr. 18, 2024

Related U.S. Application Data

(60) Continuation of application No. 17/185,680, filed on Feb. 25, 2021, now Pat. No. 11,808,956, which is a
(Continued)

(51) Int. Cl.
*G02B 5/02* (2006.01)
*F21V 8/00* (2006.01)
*G02B 27/00* (2006.01)

(52) U.S. Cl.
CPC ......... *G02B 5/0221* (2013.01); *G02B 5/0231* (2013.01); *G02B 5/0242* (2013.01);
(Continued)

(58) Field of Classification Search
None
See application file for complete search history.

(56) References Cited

U.S. PATENT DOCUMENTS 6,456,437 B1 9/2002 Lea et al.
10,877,188 B2 12/2020 Watanabe et al.
(Continued)

FOREIGN PATENT DOCUMENTS

CN 1296570 A 5/2001
CN 103775977 A 5/2014
(Continued)

OTHER PUBLICATIONS

"International Search Report and Written Opinion received for PCT Patent Application No. PCT/US2020/041390 mailed Oct. 1, 2020", 9 pages.
(Continued)

*Primary Examiner* — Derek S. Chapel
(74) *Attorney, Agent, or Firm* — ADLER POLLOCK & SHEEHAN P.C.

(57) ABSTRACT

An optical diffuser includes a body formed of a material that is at least translucent to light, a back surface for receiving output light from a light source and for scattering the output light received on the back surface to provide diffuse light, and a front surface, on the body opposite the back surface on the body, for transmitting the output light scattered by the
(Continued)

back surface as diffuse light with a predefined light distribution.

5 Claims, 16 Drawing Sheets

Related U.S. Application Data continuation-in-part of application No. 17/144,504, filed on Jan. 8, 2021, now Pat. No. 11,835,741, which is a division of application No. 16/894,489, filed on Jun. 5, 2020, now Pat. No. 10,914,875.

(60) Provisional application No. 62/880,776, filed on Jul. 31, 2019.

(52) U.S. Cl.
CPC ......... *G02B 5/0263* (2013.01); *G02B 5/0278* (2013.01); *G02B 5/0284* (2013.01); *G02B 6/0051* (2013.01); *G02B 27/0012* (2013.01)

(56) References Cited

U.S. PATENT DOCUMENTS

| | | | |
|---|---|---|---|
| 10,914,875 | B1 | 2/2021 | Raymond et al. |
| 11,808,956 | B2 * | 11/2023 | Raymond ............ G02B 5/0263 |
| 2014/0022783 | A1 | 1/2014 | Rinehart et al. |
| 2017/0242263 | A1 | 8/2017 | Raymond et al. |
| 2018/0106930 | A1 | 4/2018 | Uchida et al. |
| 2019/0369297 | A1 | 12/2019 | Arima et al. |
| 2021/0033758 | A1 | 2/2021 | Raymond et al. |

FOREIGN PATENT DOCUMENTS

| | | |
|---|---|---|
| CN | 107430219 A | 12/2017 |
| CN | 109270735 A | 1/2019 |
| JP | 2010134345 A | 6/2010 |
| JP | 2010251053 A | 11/2010 |
| TW | I566929 B | 1/2017 |
| WO | 2011143015 A1 | 11/2011 |
| WO | 2016143350 A1 | 9/2016 |
| WO | 2018130926 A1 | 7/2018 |

OTHER PUBLICATIONS

"International Search Report and Written Opinion received for PCT Patent Application No. PCT/US2022/017065 mailed on Jun. 1, 2022", 11 pages.

Extended European Search Report received for European Patent Application No. 20848150.7, mailed on Jan. 9, 2024, 8 pages.

* cited by examiner

FIG.4

```
YodaDiffuser 1.017 8-10-2018
TodaysDate    8/12/2018
Units Used  Microns

*******************     Information YodaDiffuser  **********************
Data Input File  Name  C:\Users\Howard2015\Visual
Basic\Optics\YodaDiffuser\Data1\DataYodaDiffuser1.txt
Facets are Randomly Generated
Brightness Specified Half Angles in X and Y    30    8
Type of Fall Off  Linear
Source is  Collimated
Array Size X and Y    40000    40000
Facet Size X and Y    12    12
Index of Refraction of Facets    1.5
Specified MaxTilt  Angle ( Deg.)    42
Generation Method    GenerateFacets2
Total Theoretical Facets    11111111
Number of Generated Facets    11111095
Total Number of Plotted Facets    11111095
TIR for Collimated Light, Facet Angle (Deg.)    41.81
Maximum Deflection Angle before TIR occurs ( Deg.)48.19
Design normalized to  center 1
Number of User Brightness Cells in  X and Y    7    7
Angular Spread in Cells X  Y Deg.    4  1.0666
HardCodeUsed    Design HardCoded 8 X 30 DegreesFWHM
*****  Number of RaysAssignedto EachCell *****

Matrix 11000 (21 × 21):

| | C1 | C2 | C3 | C4 | C5 | C6 | C7 | C8 | C9 | C10 | C11 | C12 | C13 | C14 | C15 | C16 | C17 | C18 | C19 | C20 | C21 |
|---|---|---|---|---|---|---|---|---|---|---|---|---|---|---|---|---|---|---|---|---|---|
| R1 | 0 | 0 | 0 | 0 | 0 | 0 | 0 | 0 | 0 | 0 | 0 | 0 | 0 | 0 | 0 | 0 | 0 | 0 | 0 | 0 | 0 |
| R2 | 0 | 0 | 0 | 0 | 0 | 0 | 0 | 0 | 0 | 0 | 0 | 0 | 0 | 0 | 0 | 0 | 0 | 0 | 0 | 0 | 0 |
| R3 | 0 | 0 | 0 | 0 | 0 | 0 | 0 | 0 | 0 | 0 | 0 | 0 | 0 | 0 | 0 | 0 | 0 | 0 | 0 | 0 | 0 |
| R4 | 0 | 0 | 0 | 0 | 2785.184 | 9887.403 | 2785.184 | 0 | 0 | 0 | 0 | 0 | 0 | 0 | 2785.184 | 9887.403 | 2785.184 | 0 | 0 | 0 | 0 |
| R5 | 0 | 0 | 0 | 2785.184 | 12811.84 | 26877.02 | 12811.84 | 2785.184 | 0 | 0 | 0 | 0 | 0 | 2785.184 | 12811.84 | 26877.02 | 12811.84 | 2785.184 | 0 | 0 | 0 |
| R6 | 0 | 0 | 835.555 | 9887.403 | 26877.02 | 47626.64 | 26877.02 | 9887.403 | 835.555 | 0 | 0 | 0 | 835.555 | 9887.403 | 26877.02 | 47626.64 | 26877.02 | 9887.403 | 835.555 | 0 | 0 |
| R7 | 0 | 0 | 3481.48 | 18103.69 | 40942.20 | 66983.67 | 40942.20 | 18103.69 | 3481.48 | 0 | 0 | 0 | 3481.48 | 18103.69 | 40942.20 | 66983.67 | 40942.20 | 18103.69 | 3481.48 | 0 | 0 |
| R8 | 0 | 139.259 | 6266.664 | 24509.61 | 51108.12 | 80770.33 | 51108.12 | 24509.61 | 6266.664 | 139.259 | 0 | 139.259 | 6266.664 | 24509.61 | 51108.12 | 80770.33 | 51108.12 | 24509.61 | 6266.664 | 139.259 | 0 |
| R9 | 0 | 279.259 | 7380.737 | 26877.02 | 54868.12 | 85644.40 | 54868.12 | 26877.02 | 7380.737 | 279.259 | 0 | 279.259 | 7380.737 | 26877.02 | 54868.12 | 85644.40 | 54868.12 | 26877.02 | 7380.737 | 279.259 | 0 |
| R10 | 0 | 139.259 | 6266.664 | 24509.61 | 51108.12 | 80770.33 | 51108.12 | 24509.61 | 6266.664 | 139.259 | 0 | 139.259 | 6266.664 | 24509.61 | 51108.12 | 80770.33 | 51108.12 | 24509.61 | 6266.664 | 139.259 | 0 |
| R11 | 0 | 0 | 3481.48 | 18103.69 | 40942.20 | 66983.67 | 40942.20 | 18103.69 | 3481.48 | 0 | 0 | 0 | 3481.48 | 18103.69 | 40942.20 | 66983.67 | 40942.20 | 18103.69 | 3481.48 | 0 | 0 |
| R12 | 0 | 0 | 835.555 | 9887.403 | 26877.02 | 47626.64 | 26877.02 | 9887.403 | 835.555 | 0 | 0 | 0 | 835.555 | 9887.403 | 26877.02 | 47626.64 | 26877.02 | 9887.403 | 835.555 | 0 | 0 |
| R13 | 0 | 0 | 0 | 2785.184 | 12811.84 | 26877.02 | 12811.84 | 2785.184 | 0 | 0 | 0 | 0 | 0 | 2785.184 | 12811.84 | 26877.02 | 12811.84 | 2785.184 | 0 | 0 | 0 |
| R14 | 0 | 0 | 0 | 0 | 2785.184 | 9887.403 | 2785.184 | 0 | 0 | 0 | 0 | 0 | 0 | 0 | 2785.184 | 9887.403 | 2785.184 | 0 | 0 | 0 | 0 |
| R15 | 0 | 0 | 0 | 0 | 0 | 0 | 0 | 0 | 0 | 0 | 0 | 0 | 0 | 0 | 0 | 0 | 0 | 0 | 0 | 0 | 0 |
| R16 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 11

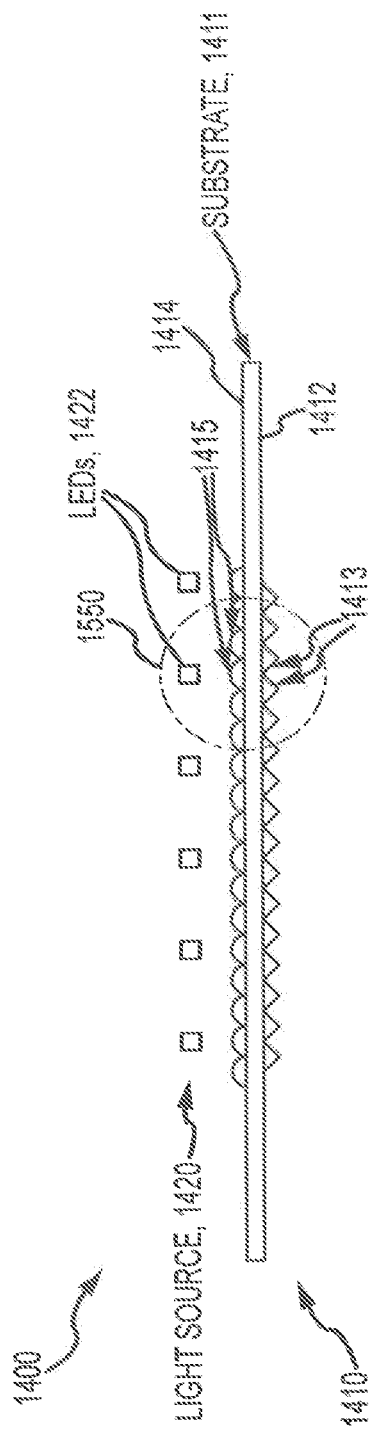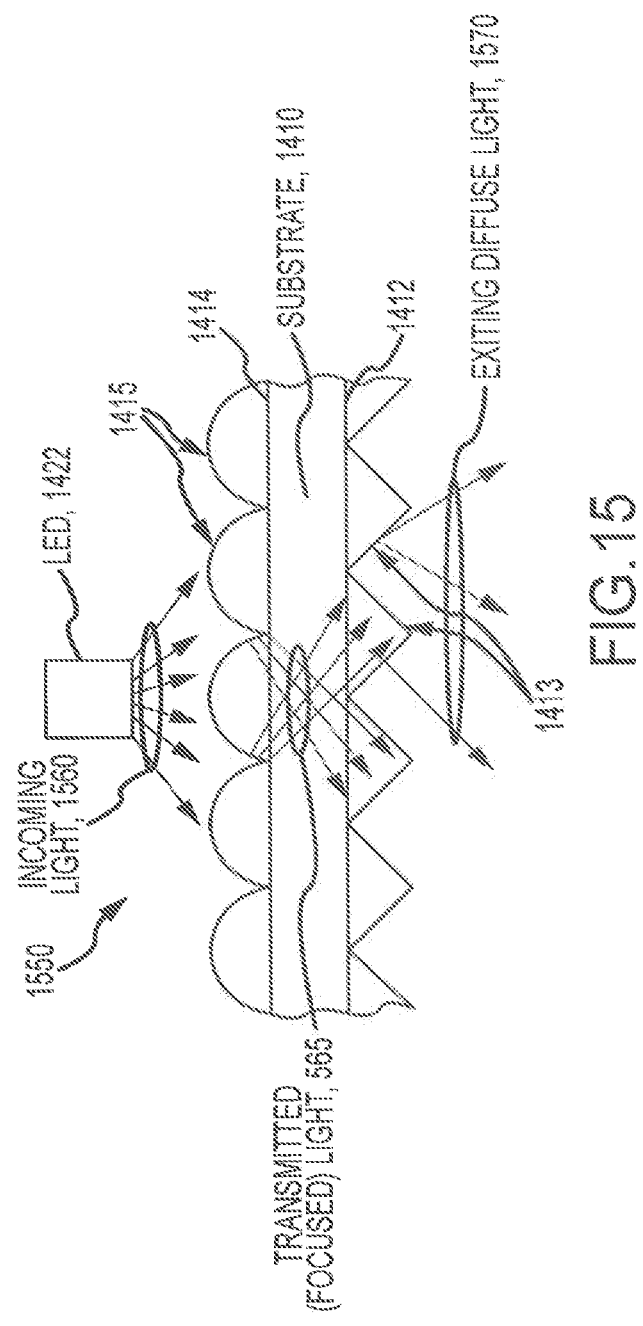
FIG. 14
FIG. 15

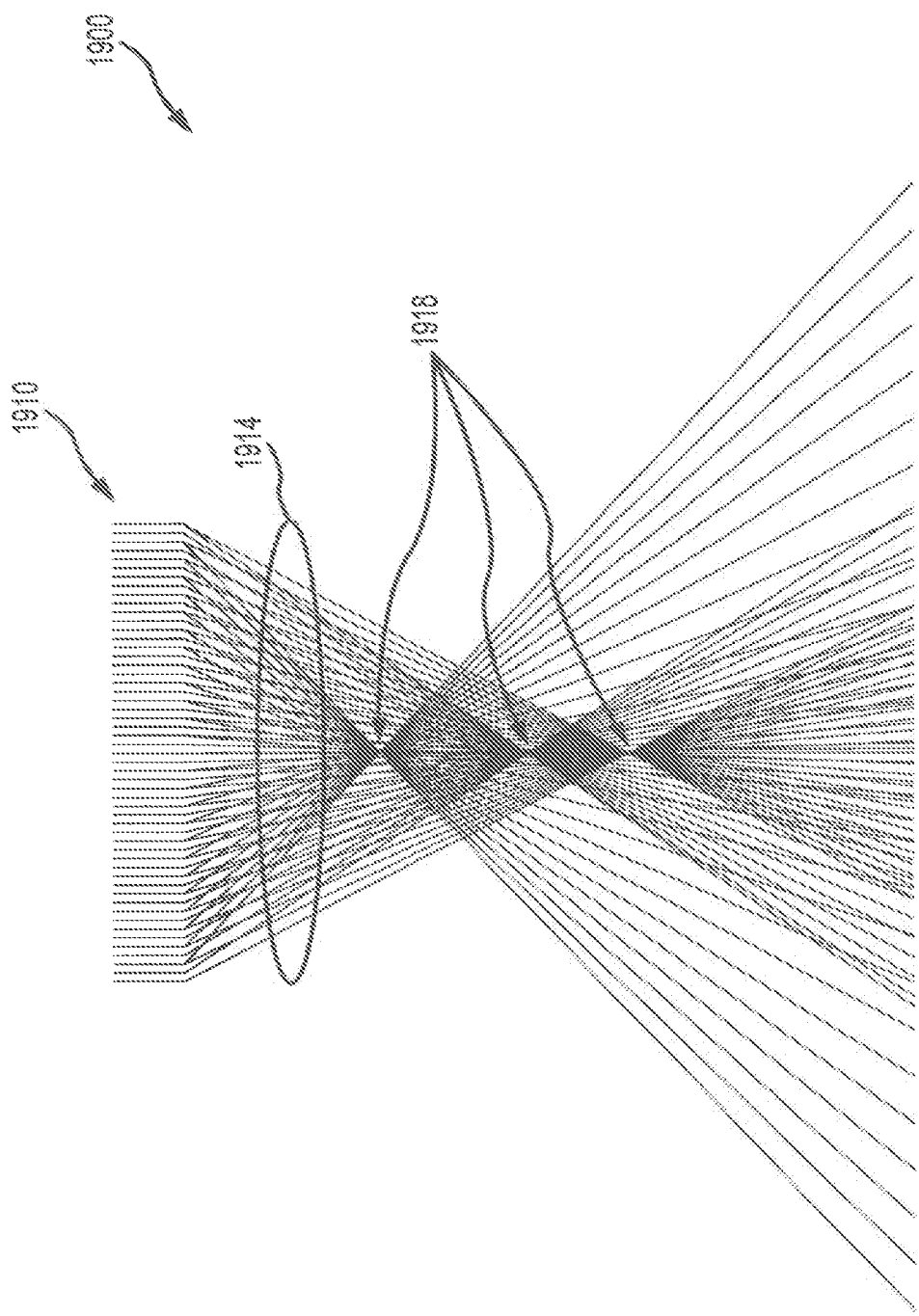

DIFFUSER COMBINING A MULTI-FACETED SURFACE AND A LENS-COVERED SURFACE TO PROVIDE SPECIFIC LIGHT DISTRIBUTIONS

CROSS REFERENCE TO RELATED APPLICATIONS

This application is a National Phase filing under 35 U.S.C. § 371 of International Application No. PCT/US2022/017065 filed Feb. 18, 2022, which claims benefit from U.S. patent application Ser. No. 17/185,680 filed Feb. 25, 2021, which is a continuation-in-part (CIP) of U.S. patent application Ser. No. 17/144,504 filed Jan. 8, 2021, which is a Divisional of U.S. patent application Ser. No. 16/894,489 filed Jun. 5, 2020 now issued as U.S. Pat. No. 10,914,875, which claims benefit from U.S. Provisional Patent Application No. 62/880,776, filed on Jul. 31, 2019, all of which are incorporated herein in their entirety by reference.

BACKGROUND

1. Field of the Description

The present description relates, in general, to light transmission, projection, and use of light transmission and projection in illuminating displays and to related devices or products. More particularly, the present description relates to an optical diffuser designed to produce a specific or predefined light distribution in space through the use of numerous facets (or microstructures or lenses) aiming light in desired directions. The description also relates to the design and production method used to create the new optical diffusers as well as to apparatus (products or devices) that include or make use of the optical diffusers such as microdisplays (such as light emitting diode (LED) screens), lighting devices of many types (e.g., lights used in the automobile industry, indoor and outdoor lighting applications, and the like), projection screens, and so on.

2. Relevant Background

There continues to be a large demand for optical diffusers (or light diffusers or, more simply, "diffusers") to diffuse or scatter light to transmit light in a desired manner such as to soften light or to spread light out so it does not appear to come from a point source. The demand for diffuse light or soft light will likely grow in the coming years due to the greater reliance on sources such as LEDs, lasers, and the like as light sources and due to the need for diffuse light in more and more devices that include microdisplays.

Diffuse light used in microdisplays, such as those in smartphones, compact computing and gaming devices, and the like, is often provided by compact optical systems with a diffuser formed of a translucent material such as ground glass, polyester films, polycarbonate substrates, opal glass, grayed glass, and the like. Conventional diffusers are made using light-scattering materials that produce a distribution of light in all directions and angles. These types of diffusers include those formed of opal or milk glasses and may also include diffusers formed of ground glass and sand blasting glass to create random surfaces to scatter transmitted light passing through the diffuser. While being useful for softening coherent or noncoherent light from a light source, these diffusers provide no control over angular light distribution or transmission, and the efficiencies of light transmission tend to be relatively low as these diffusers often produce total internal reflection (TIR).

Other types of diffusers have, as a result, been created to try to address the problems of hot spots and uneven light distribution associated with filament, arc, LED, fiberoptic, laser light sources, and other light sources. These alternative design diffusers have been relatively successful in smoothing and homogenizing sources while also providing uniform light in other applications such as for liquid crystal display (LCD) backlights, LED displays, machine vision, automotive lighting, viewing screens, and the like. Such diffusers may be made by rulings of cross-sectional shapes in a transparent material to distribute light mainly in a given XZ or YZ plane, but, in other cases, simple lenticular designs are used in the diffusers. Other more sophisticated diffusers, which may be called light-shaping diffusers, may use diffractive optical elements (DOEs) and may be used with a laser light source. These diffusers often use phase differences generated in a substrate to diffract light rays into certain directions with the DOEs, and the DOEs may be holographically recorded, randomized surface structures that can increase light transmission efficiency (e.g., to 80 percent or more), provide beam shaping, and homogenize output light.

While solving some issues with conventional diffusers, there are still a number of issues with use of even these more sophisticated optical diffusers. For example, one problem associated with highly-engineered holographic diffusers is that they are expensive and cumbersome to record. Another problem is that their structures (or DOEs) are so fine that they cannot be extruded, which is the preferred low-cost method of manufacture, as the material tends to "relax" in extrusion embossing due to the small size of the structures. Therefore, holographic diffusers are generally made in a ultraviolet (UV) cast and cure environment or process that is more expensive than extrusion. Another problem with holographic diffusers is that since the structures are so small (e.g., less than 5 microns) they are especially sensitive to dust, oils from users' hands, and so on that can render them useless or at least less efficient and less effective in desired scattering.

There remains a need for new light or optical diffusers that address these and other problems with existing diffusers. For the most part, diffusers are not engineered well and operate in a rather crude and inefficient manner by wasting light (e.g., low light transmission efficiencies) and not diffusing the light properly, which can leave hot spots. This is particularly true with LED diffusers and LED lighting. Since LEDs tend to provide very bright "spots" or points of light, they are difficult to diffuse and can create very hot areas or spots on the diffuser surface. In other cases, though, the diffusing provided by the LED diffuser is so "heavy" that it blocks most or a great deal of the light, and such low light transmission efficiency is undesirable in many applications such as for use in a display backlight. LED lighting is expected by many to nearly take over the lighting market due to energy efficiencies and general production costs associated with LED light sources, and it is highly desirable to solve the problems associated with diffusing LED lighting in the very near future.

SUMMARY

Briefly, diffusers are described herein for use in providing a user-selected light distribution in space from a wide variety of light sources including LED light sources and coherent light sources without hotspots. The diffusers are designed using a new design method that is effective in processing a user's input or desired light distribution (such as a Gaussian or non-Gaussian distribution or engineered shapes such as a product logo, an image, letters, or the like) and defining facets or microstructures for a front or light transmission surface of the diffuser. These facets are randomly distributed across this front surface in sets or cells associated with various regions (or brightness levels) within the predefined light distribution, and the assignment process is performed to set the number of facets in each set to achieve the brightness level of that set or cell (e.g., cells with higher brightness levels are assigned a proportionally higher number of facets than ones with lower brightness levels). Further, the facets assigned to each region (e.g., an angular range of the distribution) are randomly directed to direct light within the region and not only at the center of such a region to avoid hotspots.

More particularly, an apparatus is provided for producing a predefined light distribution in space. The apparatus includes a light source operable to output light. The apparatus also includes a diffuser with a substrate having a back surface receiving the light output from the light source and a front surface, opposite the back surface, redirecting and transmitting the light received on the back surface to output diffuse light with the predefined light distribution from the diffuser. The substrate is formed of a light-transmissive material (such as a "clear" polycarbonate, PET, glass, ceramic, or the like). The front surface is formed so as to include a plurality of facets that scatter or redirect that light during its transmission through the front surface, thereby diffusing the source-provided light. Each of the plurality of facets is randomly assigned to one of a plurality of sets, and each of the plurality of sets is associated with a region of the predefined light distribution.

In some embodiments, each of the facets in each of the plurality of sets has a planar face oriented to redirect the light received on the back surface in a direction within the region of the predefined light distribution associated the one of the plurality of sets to which they are assigned. Further, each of the regions of the predefined light distribution is associated with an angular range, and the direction within the region is randomly assigned to each of the facets (e.g., each facet of a set does not direct its light in exactly the same direction while still contributing to the brightness of that particular region or area of the light distribution shape). In some cases, each of the facets is defined by coordinates of the planar face on the front surface of the diffuser and by a normal vector direction to the planar face.

In the same or other embodiments, each of the sets of the facets is associated with a brightness cell defining the predefined light distribution. The number of the facets (or portion of available facets) assigned to each of the sets of the facets is selected based on a brightness value assigned to each of the brightness cells. In some cases, the predefined light distribution is a Gaussian distribution, while, in other cases, the predefined light distribution is a line focus, is an engineered shape, includes one or more letters, or includes one or more images. The light source may be a light emitting diode (LED) source, a coherent light source, a filament light source, a fluorescent light source, or a halogen light source.

In some preferred implementations, the apparatus further includes at least one additional optical element positioned to receive the output diffuse light, and the apparatus is adapted to function as a display, a projection screen, theater or film production lighting, automobile lighting, indoor or outdoor lighting, or a light curing unit. The diffuser for the apparatus may be formed via extrusion processes, injection molding, or cast and cure using ultraviolet (UV) or E beam curing of the facets.

BRIEF DESCRIPTION OF THE DRAWINGS

FIG. 4 illustrates a screenshot of a user input page or GUI provided to a user of the system of FIG. 3 by the diffuser design module showing a number of rays in each brightness cell;

FIGS. 5A and 5B illustrate a screenshot of contents of a header file showing data used and/or created by operations of a facet generation algorithm of the present description;

FIG. 10 is a screenshot of a GUI provided by the software described herein displaying brightness cells with values associated with a Gaussian-type distribution of light by a designed diffuser;

FIG. 11 illustrates a screenshot of a GUI provided by the design module of the present description displaying for a particular brightness distribution of a diffuser a total number of facets associated with or assigned to each brightness cell or set;

FIG. 14 is a simplified end view of an apparatus similar to that shown in FIGS. 1 and 2 but including a plurality of lenses on a light receiving or back surface of the substrate or body of the diffuser;

FIG. 15 is an enlarged view of a portion of the apparatus of FIG. 14 showing light traveling through the diffuser.

FIG. 19 is a ray tracing of diffusion provided by a small portion of a diffuser of the present description such as the diffusers shown in FIGS. 14-18.

DETAILED DESCRIPTION

Briefly, embodiments described herein are directed toward optical or light diffusers (or, simply, "diffusers") that are designed and manufactured to include numerous facets arranged in cells or sets in which the planar faces or outward-facing surfaces have matching orientations and transmission angles (as may be defined by direction cosines of normal to the plane containing each facet surface). The present description is also directed to the method of designing or defining the facets of the diffuser, to methods of manufacturing the diffusers, and to apparatus or products that include or make use of the new diffusers (such as microdisplays, lighting components, and so on). The multifaceted diffusers or facet diffusers described herein are optically designed to produce a user-specified distribution of light in a single direction or in multiple directions. The diffusers can be engineered through the configuration of the facets on its front or outer surface (light transmission surface) to produce nearly any type of light distribution or shape, and the diffuser design facilitates their manufacture using extrusion processes as well as other fabrication techniques such as cast and cure approaches (e.g., UV or E-beam techniques).

Figure 1:
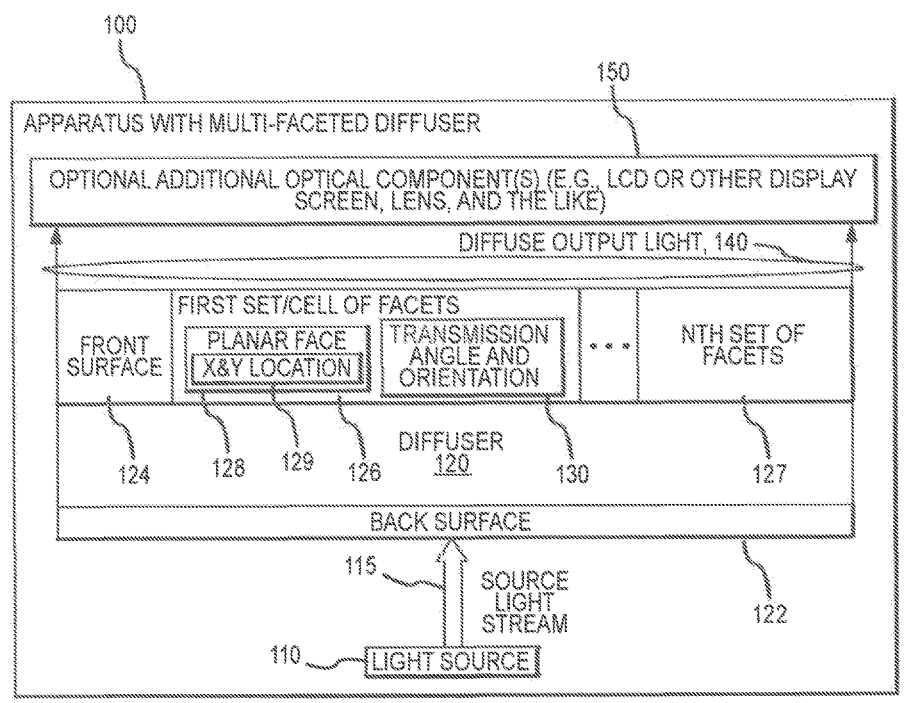
FIG. 1 is a schematic or functional block diagram of an apparatus, such as a microdisplay, a lighting device, or the like, with a "facet" or multi-faceted diffuser of the present description.

FIG. 1 illustrates an apparatus 100 making use of a multi-faceted diffuser design of the present description. The apparatus 100 includes a light source 110 that is operable to produce a light stream 115, which may be of nearly any wavelength and may be coherent when the light source 110 is a laser-based light source or non-coherent when the light source 110 is a filament source, an LED, an arc source, a fiberoptic source, or the like. Many implementations of the light source 110 provide a point or spot stream 115 such that diffusion is desirable to provide an output light 140 in the apparatus 100 that is distributed in space for a desired use such as for backlighting a display screen 150 when the apparatus 100 is a display device.

To this end, the apparatus 100 includes an optical or light diffuser (or "facet" diffuser) 120 that is disposed between the light source 110 and an output of the apparatus 100 (such as between the source 110 and an optional additional optical component 150). The diffuser 120 is formed of a substrate or body (e.g., a film or sheet) of a translucent-to-transparent material (e.g., 50 to 90 percent or more light transmissive material) such as a clear polycarbonate, PET, or the like. The diffuser 120 (or its body/substrate) has a back surface 122, which may be planar, facing the light source 110 for receiving the light stream 115 from the light source 110, and the surface 122 may be arranged to be orthogonal or at another orientation to the directional or travel axis of the stream 115.

Further, and significantly, the diffuser 120 (or its body/substrate) includes a front surface 124 opposite (and typically parallel to) the back surface 122 that is used to scatter and redirect light 115 passing through the diffuser 120 to produce the diffuse output light 140. The front surface 124 is formed so as to include a plurality of sets/cells 126, 127 each with a plurality of facets. This can be seen with exemplary first set or cell of facets 126 each with a planar face/surface 128 at a defined location (e.g., an X-Y coordinate 129 of a center of the face/surface 128) on the front surface 124. Each facet of the set/cell 126 is configured to have a particular orientation and transmission angle 130, which may be defined by the direction cosines of normal to the plane including the face/surface 128. Each set/cell 126 may be adapted or configured to scatter or direct the light transmitted from the front surface 124 in a different manner to provide the diffuse output light 140 such that light 140 has a user-specifiable distribution of light 140 in a single direction or multiple directions.

The apparatus 100 may further include optional additional optical components 150 to allow the apparatus 100 to fulfill different purposes. For example, the optical component 150 may be a LCD or other display screen such that the combination of light source 110 and diffuser 120 act as a backlight for the screen/component 150 with diffuse output light 140. In other cases, the optical component 150 includes a lens and/or optical cover when the apparatus 100 takes the form of a lighting device (e.g., an automobile headlight, taillight, or the like). In other cases, the apparatus 100 may take the form of LED lighting, an LCD/LED display, a projection system, a sign/display, a front projection screen, a mobile phone/smartphone, a barcode scanner, an inspection system, outdoor or indoor lighting, medical instrumentation, fiber optic illumination device, or the like.

Figure 2:
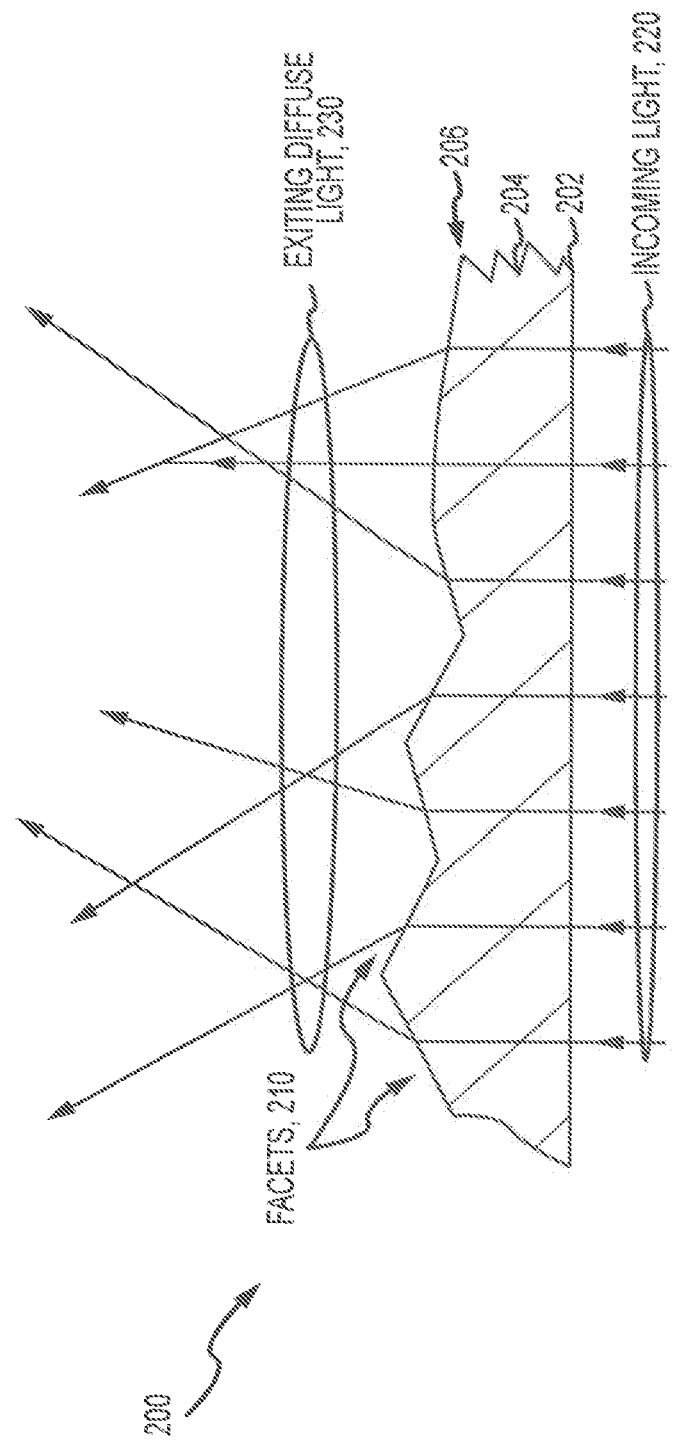
FIG. 2 is a cross-sectional view of an exemplary diffuser of the present description such as may be used in the apparatus of FIG. 1.

FIG. 2 illustrates a cross-sectional and greatly enlarged view of an optical diffuser 200 of the present description such as may be used as the diffuser 120 of the apparatus 100 of FIG. 1. As shown, the diffuser 200 has a body or substrate 204 with a back or first side 202, which may be planar as shown. The back side 202 is exposed to an output of a light source (not shown in FIG. 2 but understood from the light source 110 of FIG. 1) such that it receives incoming light 220 that is illustrated as being composed of numerous parallel rays (or as being non-diffuse light). The body/substrate 204 is formed of material that is highly transmissive of light such as a clear polycarbonate, PET, or other plastic, a glass, a ceramic, or the like that may be 70 to 90 percent transmissive or more (and may be labeled herein as "clear" even though not wholly efficient at transmitting light 220).

The incoming light 220 is received through the back surface 202 and travels basically unimpeded until it reaches the front or second surface 206 of the diffuser 200. The front or second surface 206 is opposite to the back or first surface 202, and it is uniquely formed so as to have numerous facets 210 each with a uniquely oriented and angled (at a transmission angle) face to scatter the light 230 that is transmitted from the front surface 206 to provide diffuse light 230. One ray is shown for each facet 210 for ease of illustration, but, in practice, each will receive and scatter numerous rays of the incoming light 220. As can be seen from the simplified version of a diffuser 200, the facets have different orientations and transmission angles, which may be defined by their direction cosines of normal to the plane containing the face/exterior surface of each facet 210 so as to provide a desired distribution of incoming light 220 in the diffuse exiting light 230 in a single direction or multiple directions and with desired light shaping.

The diffuser 200 achieves the transmission of diffuse light 230 through the inclusion of the small facets 210, which may be rectangular (e.g., square) in shape and substantially planar on their faces/exterior surfaces, with dimensions (e.g., sides) in the range of 6 to 350 microns. A more preferred size for the facets 210 may be 12 to 100 microns (as measured along a side), but some embodiments may use larger or smaller facets. All the facets 210 of a diffuser 200 may have matching sizes and shapes in some embodiments (e.g., all facets 210 may be square in shape with equal side lengths chosen from range of 12 to 30 microns (or another useful range)) while other embodiments may use differently sized facets 210 (within a set or cell or among different sets/cells).

Each facet 210 is defined, as explained below in more detail, during the design and manufacture process by calculating its direction cosines of normal and arranging them at locations about the front surface 206 to produce refraction of parallel incoming light 220 into a desired direction(s). Many such facets 210 would be designed or calculated such as hundreds of thousands to several million depending on the size of the facets 210 and the size of the diffuser 200, and each facet orientation and transmission angle (or direction cosines of normal) is selected to direct light 230 to user-specified areas in space. This selectable distribution of diffuse light 230 allows the user to project images or messages in the space or area illuminated by the diffuse light 230.

The general impact of the new design of the diffuser 200 is quite large and disruptive as it allows one to manufacture highly engineered and refined diffusers at a cost equal to or less than traditional diffusers. Further, the diffuser 200 has shown in simulations to have much higher light transmission efficiencies than conventional diffusers such as 90 percent or greater when compared with less than 50 percent for some conventional diffusers.

Figure 3:
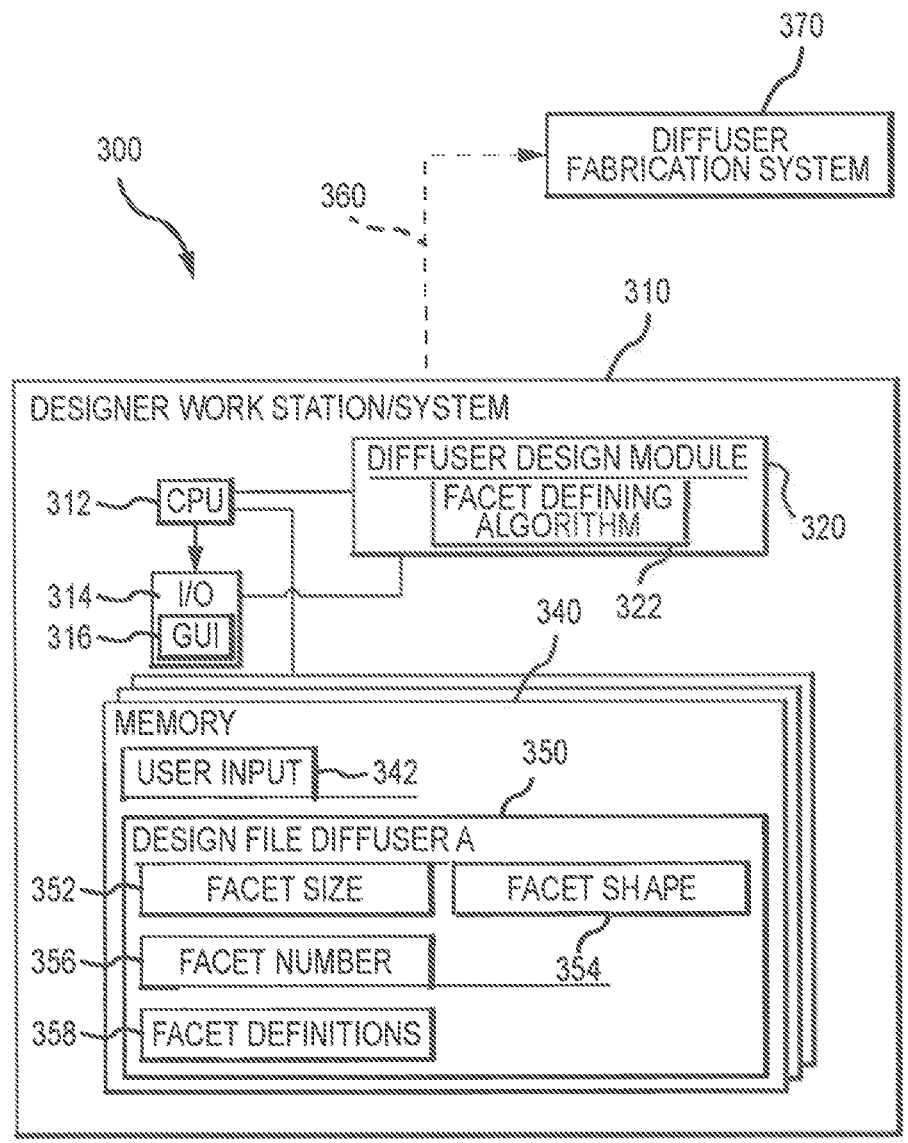
FIG. 3 is a functional block diagram of a system for designing and producing optical diffusers of the present description such as those presented with reference to FIGS. 1 and 2.

FIG. 3 is a functional block diagram of a system 300 for designing and producing optical diffusers of the present description, such as those presented with reference to FIGS. 1 and 2. As shown, the system 300 includes a workstation or computing system 310 that may be used by an operator or designer to design a diffuser to provide a user-specified light distribution. The workstation 310 may be nearly any computing system useful for performing the functions described herein such as a desktop, a laptop, a notebook, a pad, a smartphone, or the like. The workstation 310 includes a processor(s) 312 that processes of executes code, instructions, and/or software to perform or provide the functions described herein of a diffuser design module 320. Particularly, the design module 320 uses a facet defining algorithm 322 to generate definitions of facets for a diffuser to achieve a user-selectable light distribution.

The processor 312 also manages operations of input and output (I/O) devices 314 of the system 310 such as a monitor or display, a keyboard, a mouse, a touchscreen or pad, and so on that allow an operator of designer using the system 310 to input data and to view information presented by the module 320. To this end, the module 320 may be configured to generate a graphical user interface (GUI) 316 that may be displayed on a monitor of the system 310 provided in the I/O) devices 314, and an operator may interact with the GUI 316 to provide a set of user input 342 that is stored in memory/data storage 350 of the system 310 by processor 312.

The user input 342 along with other information such as size and shape of a front side or surface of a diffuser, transmissivity of the material used to form the diffuser, and the like is used as input by the facet defining algorithm 322 to generate for diffuser a design file 350 that can be stored in memory 340 by the processor 312. This file 350 is then passed as output as shown with dashed arrow 360 (e.g., by wired or wireless communications) to a diffuser fabrication system 370 such as an extrusion system, a cast and cure system, or the like.

Each design file 350 may include information including facet shape 354 (such as rectangular, square, or the like), facet size 352 (e.g., 12 microns by 12 microns for a square-shaped facet surface/face), and facet number 356, which may be provided in user input 342 or, more often, is calculated by the module 320 based on the facet size 352 and the size and shape of the diffuser's front or exterior surface so as to substantially cover this surface with facets. Further, each diffuser's design file 350 includes facet definitions 358 generated by the facet design algorithm 322, and these may include a location for each facet (e.g., X-Y coordinates of a center point of the planar face/surface) and its direction of cosines to normal (or orientation and transmission angle of the face/planar surface of the facet).

The inventors created a computer program, to implement the diffuser design module 320 with its facet defining algorithm 322, and this program is adapted to take a designer's (or customer's) design for a diffuser as input. Further, the program allows the designer to program and/or modify their design and to execute them to generate a design file (e.g., file 350 in FIG. 3) that can be used to fabricate diffusers according to the program-generated design (e.g., with definitions of each facet on the front or exterior surface of the diffuser).

At this point in the description, it may be useful to walk through what input (e.g., user input 342 in FIG. 3) the program requests or uses to create a diffuser design and how the designer/user may enter this in some exemplary but not limiting implementations. In one example, the user, when using the program on their computing device, enters data that represents angle locations for each of two angles. The first angle is along the X-axis and the other is along the Y-axis. The user is presented (in a GUI or the like on their monitor or display device) with brightness cells, and the user can enter desired brightness values for each cell (such as in fractions of one or percentages). The program may have some default or hard-coded values for a few diffusers that have been previously designed, and these can be used by the program to automatically fill the brightness cells with these values, which the designer/user may then modify (or accept).

Each cell represents a compound angle at which rays of light will be aimed by the facets of the diffuser being designed. The user input entries can be in fractions of a center cell or the number of rays for the desired direction. The program can automatically calculate the number of rays of input light from the source to go to each cell based on the cell sizes and the overall size of the diffraction substrate (and its exterior or front surface containing the facets). For example, the facets may be sized (by default settings or user input) to have 12-micron square faces/surfaces while the diffuser is defined (again by default or user input) to have a 40,000-micron square area on its front or exterior/transmission surface, and the program would determine that 11,111,111 total facets can be provided on this surface and need to be defined. The program automatically fills the cells in proportion to the user input and total number of facets available. FIG. 4 illustrates a screen shot 400 of the user input page or GUI displayed to the user by the program that shows the number of rays placed in each cell by the program for use in distributing received light from a source from the diffuser's multi-faceted front surface in a user-specified manner.

The computer program is configured to take the user design information and generate each facet normal that will refract rays along the desired paths (associated with the cells to which they are assigned by the program). Significantly, the program is further configured such that the facets are generated in a random location on the front or exterior surface of the diffuser under design. This allows edges of replicated diffusing substrates according to the design to be joined together to form a larger diffuser (e.g., 1 to N diffusers formed according to a diffuser design can be assembled in an abutting manner to form a single diffuser with a light distribution defined by the configuration of each sub-diffuser or substrate). This can be extremely important and unique to this description as the tooling costs of a small facet array (one for a front surface of a small-surface area diffusing substrate or diffuser) can be quite expensive. The random nature of the facet locations allows the smaller diffusers/substrates to be stepped or recombined without creating a "jump" or seam in a fabricated diffuser that would be noticeable in the output diffuse light or output light distribution.

The following is a segment of code that may be used to implement the facet generation subroutine of the computer program (e.g., facet defining algorithm 322 of FIG. 3) along with narrative description of the functionality and output for portions of the code:

```
maxzdc = Cos(MaximumSpecifiedTiltRad)
'set up the unavailable array
For j = −NBCY To NBCY
    For i = −NBCX To NBCX
        nraysneeded(i, j) = BC(i, j)
    Next i
Next j
nrays = 0
nraysold = 0
getout = False
While getout = False
' assume that the center of the center cell is at polar angles 0,0 or x=y−0
    For j = −NBCY To NBCY ' the cell numbers (locations to be calculated in the following
sub )
        For i = −NBCX To NBCX
            icount = icount + 1
            If icount > 10000 Then 'check how many rays are available
                If nraysold = ns Then
                    getout = True
                Else
                    getout = False
                End If
                icount = 0#
                nrays = 0#
                For jj = −NBCY To NBCY
                    For ii = −NBCX To NBCX
                        nrays = nrays + nraysneeded(ii, jj)
                    Next ii
                Next jj
                If getout = False Then
                    If nrays > 0 Then
                        getout = False
                    Else
                        getout = True
                    End If
                End If
                nraysold = ns
                Form1.Label(0).Caption = "Generating Facet Normals Working on Facet Number
" + Str(ns) + " rays available " + Str(nrays)
                DoEvents
            End If
            thetaleftrad = CDbl(i) * BCThetaRadX
            thetabottomrad = CDbl(j) * BCThetaRadY
            If nraysneeded(i, j) > 0# Then
                'randomly choose a ray location within the degree band
                'xstarting point on sphere
                xstart = r * Sin(thetaleftrad − BCThetaRadX / 2#)
                ystart = r * Sin(thetabottomrad − BCThetaRadY / 2#)
                xstop = r * Sin(thetaleftrad + BCThetaRadX / 2#)
                ystop = r * Sin(thetabottomrad + BCThetaRadY / 2#)
                xdiff = Abs(xstop − xstart)
                ydiff = Abs(ystop − ystart)
                'use random number generator to pick an x and y in the spherical ( cell )---
                xrandom = xdiff * Rnd( )
                yrandom = ydiff * Rnd( )
                xi = xstart + xrandom
                yi = ystart + yrandom
                s2 = xi ? 2 + yi ? 2
                If s2 < r Then '
                    zi = Sqr(r ? 2 − xi ? 2 − yi ? 2)
                    s1 = Sqr(xi ? 2 + yi ? 2 + zi ? 2)
                    'cal DC values ( assume that all rays start at 0,0 )
                    e1x = 0#
                    e1y = 0#
                    e1z = 1#
                    e2x = xi / s1
                    e2y = yi / s1
                    e2z = zi / s1
```

```
                    s1 = s1
                    'use these values to calculate normals of facets
                    Call facet_normal_finder_and_check(an1, an2, e1x, e1y, e1z, e2x, e2y, e2z, nx,
ny, nz, frsn_true)
                    If frsn_true = True Then
                        If nz > maxzdc Then
                            max_angle = True
                        Else
                            max_angle = False
                        End If 'max angle
                        If max_angle = True Then
                            ns = ns + 1
                            FacetDCX(ns) = nx 'direction cosines of facet
                            FacetDCY(ns) = ny
                            FacetDCZ(ns) = nz
                            nraysneeded(i, j) = nraysneeded(i, j) − 1
                        End If 'max_angle=t
                    End If 'frsn_true=t
                End If 's2<1
            End If 'nraysneeded>0#
        Next i
    Next j
Wend
Form1.Label(0).Visible = False
Call Calculate_Maximum_Tilt_Angle
```

Figure 5B:
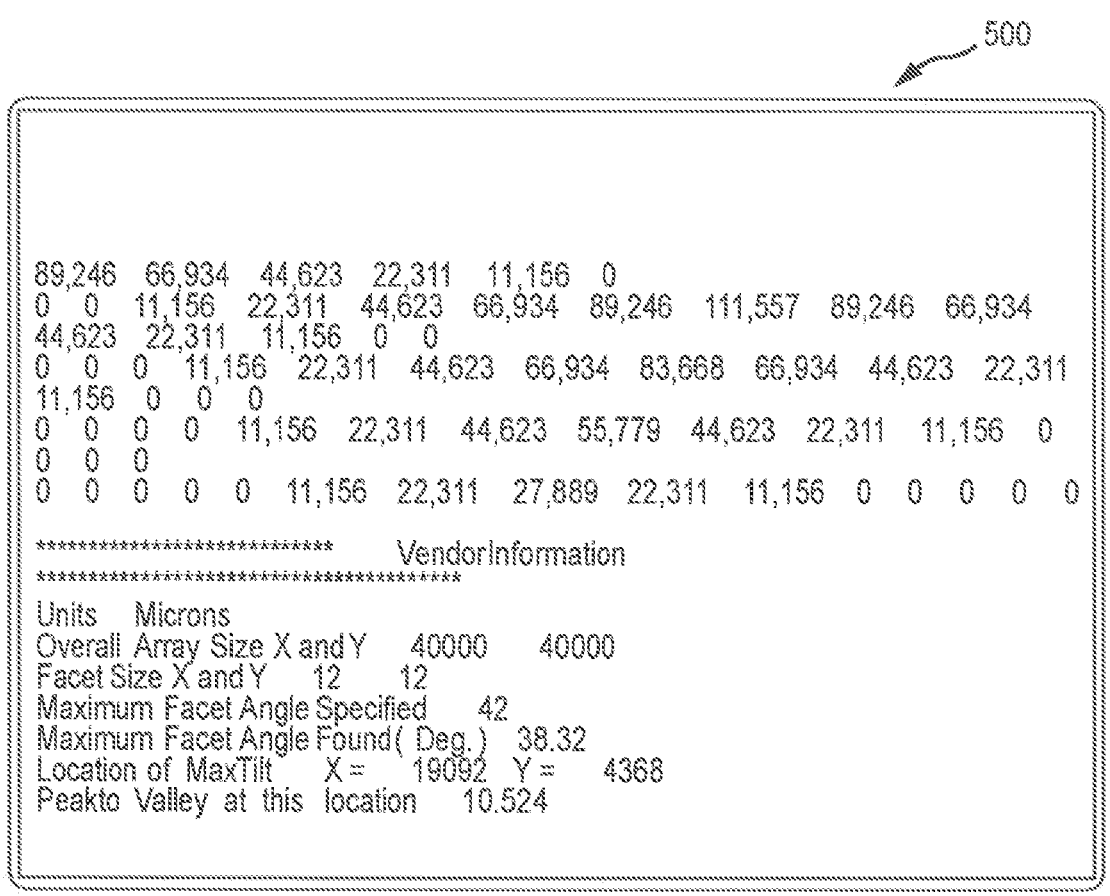
Figure 6:
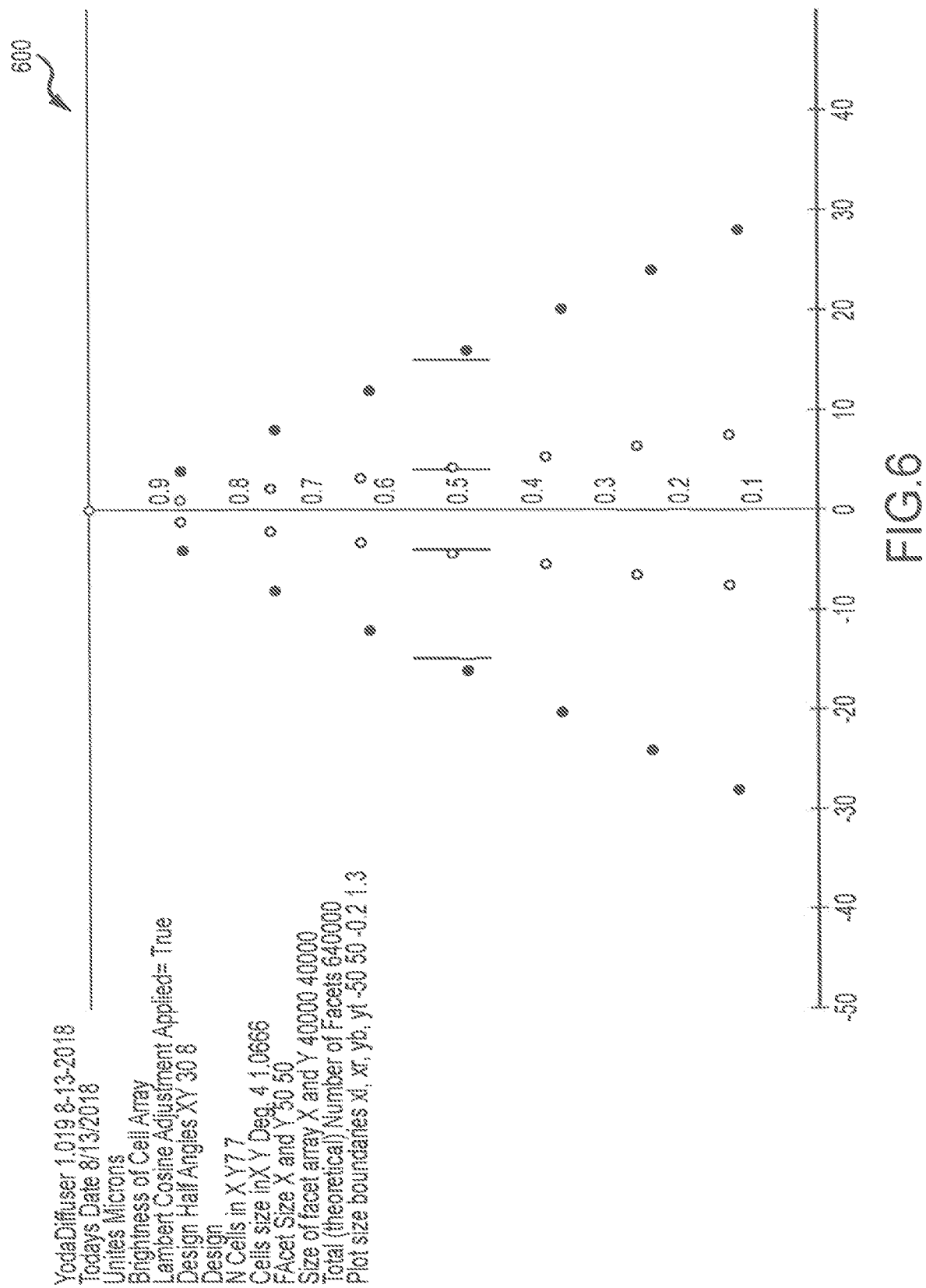
FIG. 6 illustrates a graph or plot plotting out relative brightness versus deflection angle for a designed diffuser such as the one of FIGS. 4-5B.
Figure 7:
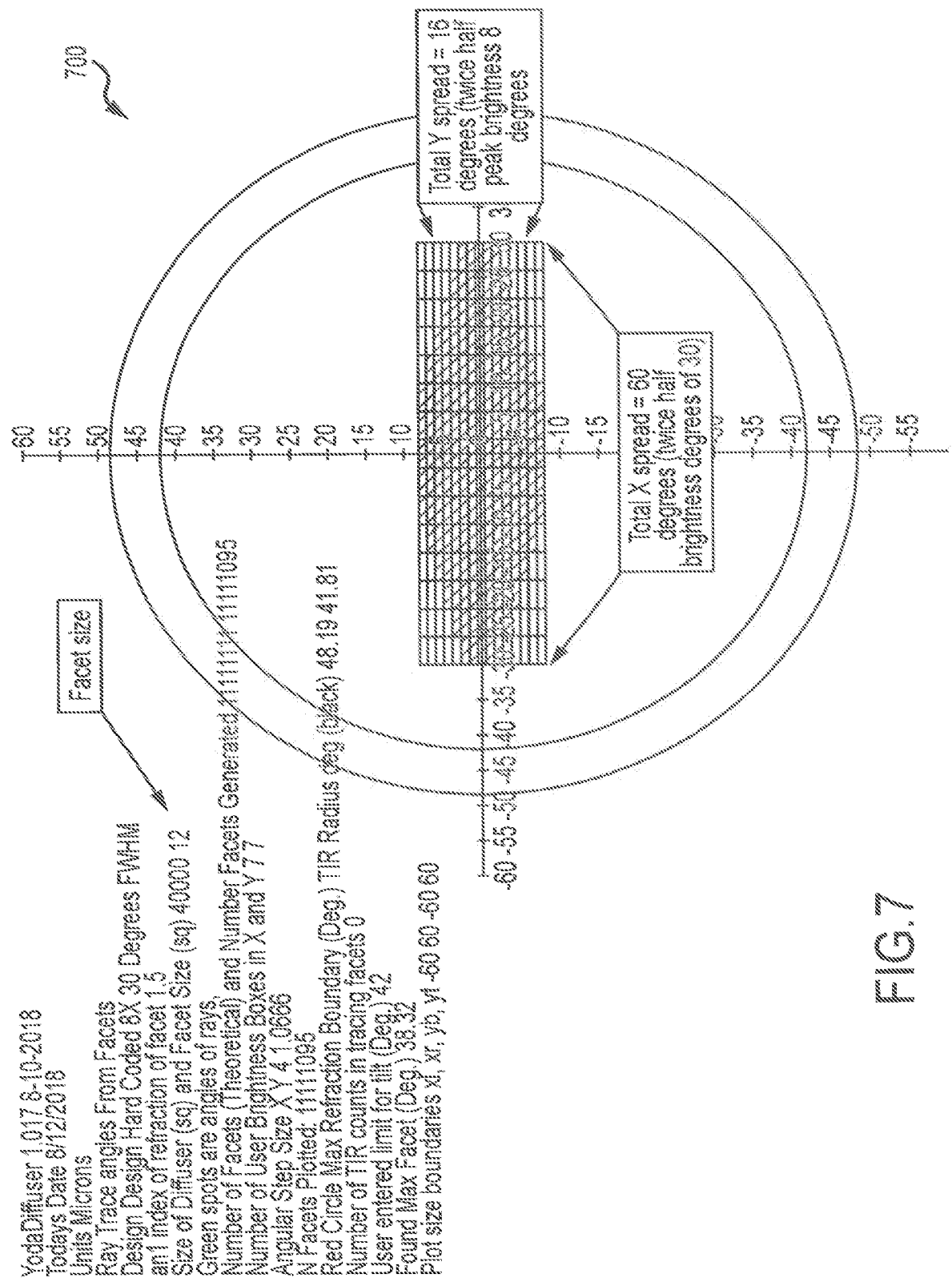
FIG. 7 illustrates a graph or plot showing direction of rays transmitted from a diffuser designed according to the present description such as diffuser of FIG. 4-5B.

The details of the numbers and data used in these calculations can be output to a header file, which may include data as shown in the screen shot 500 of FIGS. 5A and 5B as may be viewed by a diffuser designer on their workstation. This header is also put on top of the vendor file to keep track of the calculation details. The final output file is a very long file containing the direction cosine of each of the 11,111,111 facets in this example. The file is too long to be practical to attach this description. However, FIG. 6 illustrates a graph or plot 600 plotting out relative brightness versus deflection angle for a designed diffuser such as the one of FIGS. 4-5B, and FIG. 7 illustrates a graph or plot 700 showing direction of rays transmitted from a diffuser designed according to the present description such as diffuser of FIGS. 4-5B. In FIG. 7, it can be seen that the total X-directional spread is 60 degrees while total Y-directional spread is 16 degrees.

As will be appreciated from the above discussion of the diffuser design module and its associated algorithms, the inventors' ideas can be implemented using software (and/or firmware) that generates data files. The data files are used by a diffuser designer to create refractive elements or facets on a diffuser surface that send rays of incoming light from a light source(s) in desired directions and at desired intensities, with both being user selectable via user input to the software. The software is configured so that various inputs may be used by the user to define the final output (e.g., a diffuser design file with defined facets), and these may include: (a) facet size; (b) array size (e.g., total final output canvas that may be associated with a diffuser's front/transmission surface); (c) index of refraction for both facet and film on which facet exists (or an indication of which transmissive material is used along with film thickness), (d) angle of light diffusion desired (typically give in degrees); and (e) final product facing direction (facing toward/away from light source).

After these general parameters have been defined (through input or values stored and/or accessed by the program), the program provides a user interface to allow the user to use a "cell"-based system or approach to defining how the brightness of the source light is distributed through the defined angular distribution of light diffusion. In some cases, manually inputting brightness values can be tedious for the user of the program. To address this potential issue, the inventors have added a function to the program that allows the input of data files which contain brightness information for each cell (e.g., a starting or default brightness that can be accepted or modified by the user).

Figure 8:
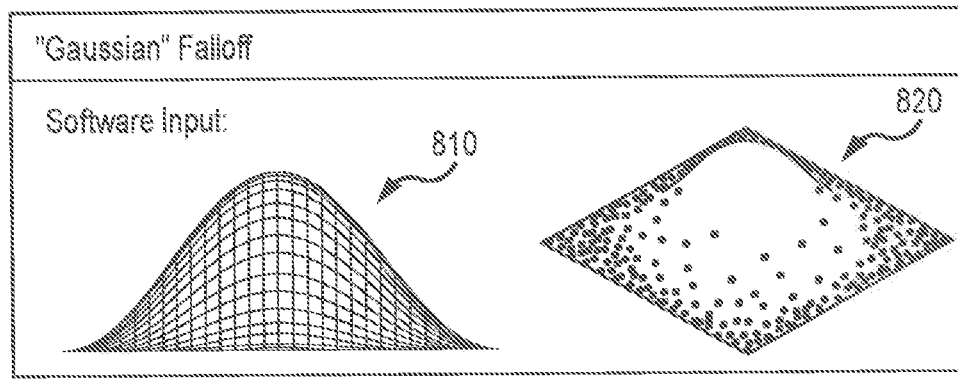
FIG. 8 illustrates an exemplary brightness geometry that may be generated by software described herein and includes an orthographic side view of a brightness curve and an isometric view of the curve with value levels shown with gray values.
Figure 9:
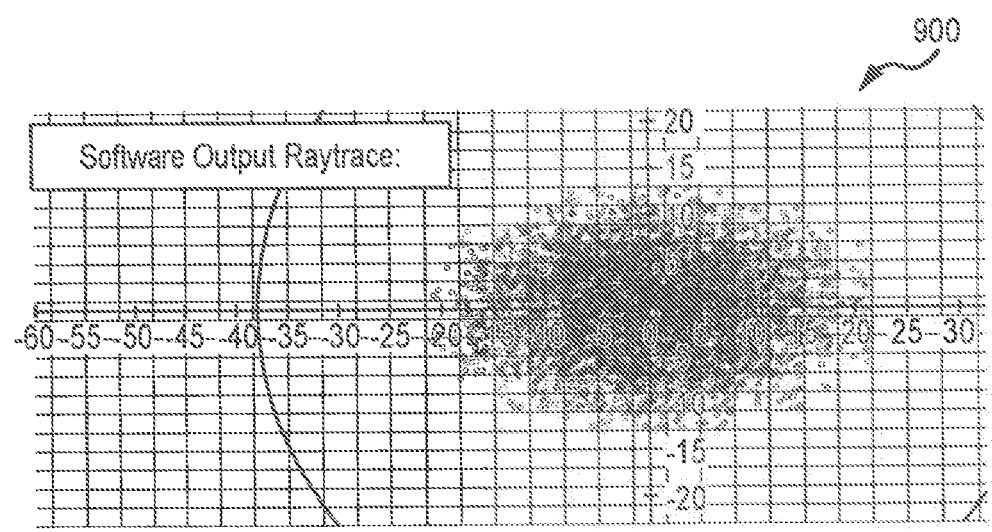
FIG. 9 is a graph showing results of a raytracing for the brightness curves of FIG. 8.

In one particular prototype implementation, the data files used to prefill the cells were generated in 3D software (e.g., AutoDesk® Maya®) FIG. 8 illustrates an exemplary brightness geometry that may be generated by the 3D software, and the brightness may be designated visually by vertex height and gray value. In FIG. 8, representation 810 is an orthographic side view of a brightness curve while representation 820 is an isometric view of the curve with value levels shown with gray values. In summary, a 3D "brightness" curve is generated by the 3D software with points along the curve then being converted to a format that can be read in by the software and used as appropriate brightness values. The inventors further employed a software routine to perform raytracing of designed diffusers, with FIG. 9 showing a graph 900 providing results of a raytracing for the brightness curves 810, 820 of FIG. 8. As can be seen from the graph 900, the ray count softly drops to zero as the angle of light diffusion increases toward user-specified settings.

Once the brightness value file (user input) has been generated and input into the software/design module, the brightness cells are normalized by the software such as to feature a maximum brightness of one. Such a brightness distribution can be seen in the screenshot of the user interface GUI 1000 shown in FIG. 10, which includes a cell chart displaying the brightness values of each cell based on the "Gaussian" curve as seen in FIG. 8. Each cell represents a certain degree range that is based on the final desired distribution angle. Numbers within each cell represent brightness values for that particular degree range. For example, if the diffuser is being designed to have a 30 degree by 30 degree distribution and there are 15 cells, each cell represents a 2 degree by 2 degree region of the final output of diffuse light. Note, in FIG. 10, that the corner cells contain zero facets and, therefore, zero brightness as the intended distribution in this example is ellipsoidal in shape.

If the user/designer finds these brightness values satisfactory, they can instruct the algorithm to continue with adjusting the calculate brightness values to reflect the total number of available facets on the diffuser being designed. The final calculation process converts decimal numbers into whole integers (as it is not likely practical to fabricate fractional facets). The total number of facets is determined by facet size (which may be a default value or be selected from predefined ranges by the user/designer via their user input) and by the overall canvas size (or size of the diffuser front/transmission surface being designed).

FIG. 11 illustrates a screenshot 1100 of a GUI providing brightness distribution of a diffuser under design showing a total number of facets associated with each brightness cell or set (e.g., number of facets assigned to distributing light in the direction and/or location associated with the brightness cell). The numbers contained in each cell reflect the total number of facets that will be assigned to that cell's designated degree range and will be tilted (or oriented) upon manufacture to refract incoming light somewhere within that degree range (with the face/surface of each facet in a cell/set having a like direction cosines of normal).

If these values are deemed satisfactory by the user/designer, the software then proceeds with the algorithm by assigning facets to cells. Each facet assigned to a cell has its tilt angle randomized while still falling within a range acceptable for the cell so as to allow for a smooth distribution of light. However, some embodiments may have all facets for a single cell pointing at the direct middle angular value for the cell, but, in some cases, this may result in hot spots for each cell degree range (which may not be suited for many light distribution applications). Further, the algorithm is configured such that the assignment of facets across the face/surface of the diffuser is random and is not determined by facet location or cell angle. This random distribution of the facets to the cells/sets combined with the microscopic facet size has been proven by the inventors to produce diffusers that refract light being transmitted through the diffuser in an appropriate manner to achieve a particular distribution regardless of where the incoming light from the light source contacts the back surface of the diffuser and, thus, the facet array on the front or transmission surface of the diffuser.

Once the software has assigned all facets that are available to a cell/set, the software outputs a text file (diffuser design file) containing X-Y coordinate data as well as dX/dY/dZ tilt (or orientation) data for each facet. This text file can then be used to manufacture resist or tools for use in fabricating a diffuser with a surface having such cells or sets of facets that can be provided in an optical apparatus to provide user-defined distribution of light from a light source. For example, the text file may be used to create planar array precision tooling into a master (which may be a glass master or the like), and this master may be used to grow or form shims (e.g., nickel shims or the like). The shims may then be used to make transparent castings such as through the use of UV curable fluid, and the quality of the final castings (e.g., the diffusers) match the initial tooling exactly or at least with very high precision. Hence, shining a light through these transparent or semi-transparent castings results in the initial brightness distributions input to the software by the user/designer (such as via the cell GUI shown above).

Figure 12:
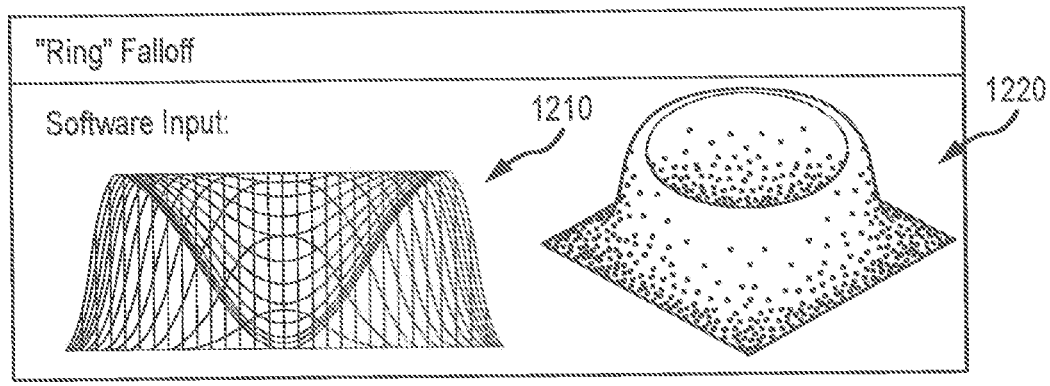
FIG. 12 illustrates a second exemplary brightness geometry that may be generated by software described herein and includes an orthographic side view of a brightness curve and an isometric view of the curve with value levels shown with gray values.
Figure 13:
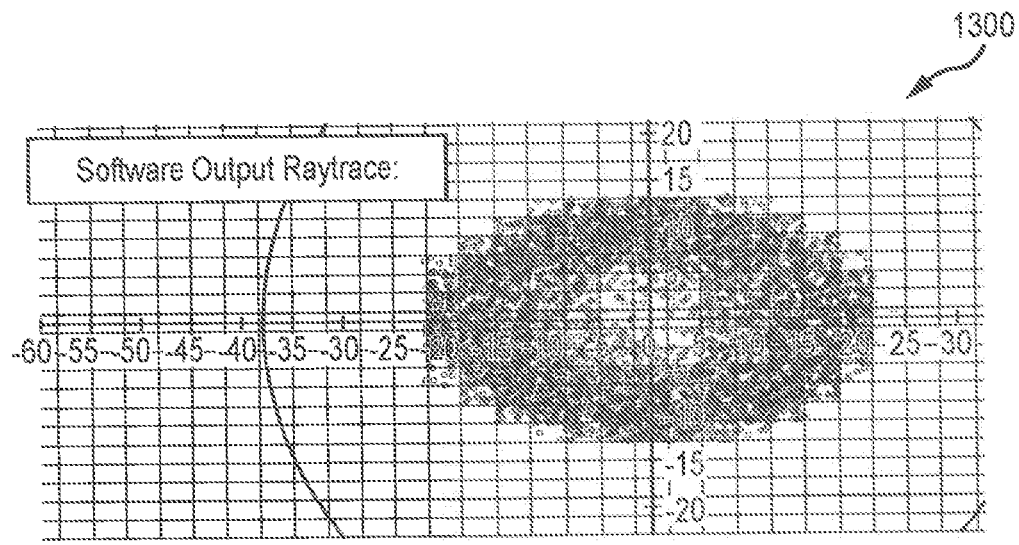
FIG. 13 is a graph showing results of a raytracing for the brightness curves of FIG. 12.

As will be appreciated, the above techniques can be used to generate light distributions with a diffuser to suit nearly any user's needs and is not limited to the geometry shown in FIGS. 8 and 9. As one example, FIG. 12 illustrates an exemplary brightness geometry that may be generated by the 3D software, and the brightness may be designated visually by vertex height and gray value. In FIG. 12, representation 1210 is an orthographic side view of a brightness curve while representation 1220 is an isometric view of the curve with value levels shown with gray values. The input curves are useful for generating a light distribution with a "ring" brightness falloff. FIG. 13 shows a graph 1300 providing results of a raytracing for the brightness curves 1210, 1220 of FIG. 12.

At this point in the description, it may be useful to provide additional details on the algorithm(s) carried out by the software/computer program used to design diffusers along with some of the mathematical challenges addressed and overcome by the inventors. First, the inventors understood that most present-day diffusers are holographic or utilize lens structures. In the present case, the goal was to be able to create Gaussian and non-Gaussian diffusers that were generated (defined) in software and that could be tooled quickly and effectively. It was also a goal that these types of diffusers would be designed and fabricated such that they would work (e.g., properly diffuse light per a designer's input) regardless of the area the incoming light from a light source (e.g., an LED, a laser-based light source, and so on) moves through the diffuser in a transmission mode (as well as reflected when desired) such that a light source does not have to be accurately aligned with a center of the diffuser or be stationary behind the diffuser. As will be appreciated by those in the optics and light transmission arts, the transmission mode for the new diffusers proved to be extremely challenging.

In order to create the new front/transmission surface of the diffusers with such goals in mind, it was determined by the inventors that the structures or facets should be randomized in their location on the front/transmission surface. Randomized location of sets or cells of facets directing light in certain directions (e.g., degree ranges as discussed above) is useful so that regardless of whether one is using a laser or an LED light the same shape of the light would occur (or distribution) (e.g., a particular input stream is not required for the new diffuser design). This also requires random structures within a subset of structures (e.g., within each brightness cell or set of facets assigned to provide a particular redirection of incoming light). Because of this, smaller tooling could be made (or fabricated diffusers with such smaller tooling) and then put together in a step-and-repeat environment even by overlapping structures without having resulting visible jumps in the light as the light source moves across the structures. The advantage of facet-based structures that can be programmed at any angle in just moments was dramatic and unexpected. For example, programming and tooling for a diffuser design according to this description is relatively fast. Further, the new diffuser design allows replacement of prior holographic-type diffusers and holographic masters, which can be expensive and difficult create, do not have to be shot or used.

The challenge and one unique aspect of the invention is that the mathematics to solve this problem were found to be unusual and unconventional. The following discussion describes some of the contributions provided by the inventors (or accomplishments) as well as the base logic behind the algorithm carried out by the software/computer program described herein. Normally Snell's law can be used when the normal vector to a surface is known In this case, the normal vector to a facet's planar surface/face is not known to find the refraction of the ray to a desired location. In other words, Spell's law had to be re-written by the inventors mathematically to give the starting ray a refractive surface to find the surface normal that will refract the ray to a desired location.

In order to do this, the inventors rewrote or modified Snell's law in a vector formulation. This rewrite required that the cross product of two vectors form a third vector to hit the desired location of the ray. In the mathematics of the rewrite, the sine of the angle between the two vectors is proportional to the cross product. During initial efforts by the inventors, it appeared there might not be a solution to create an equation (or several equations) that could be solved as part of the software (or its algorithm). In this case, it was surmised that the software could be configured to calculate an optimized solution without a firm solution, and, it should be understood that the present description encompasses software that uses such an optimized solution to finding and defining the normal vectors to each facet.

However, it was discovered, in time and through significant efforts by the inventors, that the equation(s) could be solved, and a more preferred embodiment to the algorithm carried out by the software (or diffuser design module/program) involves creating a cross product in a normalized format in which the sine of the angle between the two vectors is proportionate. By solving the equation(s), the diffuser can be designed to contain a very large number (hundreds of thousands to millions) of carefully oriented facets to bend/direct light into any shape or light distribution desired (even letters or symbols) with high efficiency. Importantly, incoming light need not be collimated, it can be input as any incoming vector (or even average of the incoming light vector) and still be refracted/redirected to the desired location by the facets on the front/transmission surface of the diffuser. In the past, this had proven to be extremely difficult if not impossible for most diffusion systems.

As noted above, the facets defined for a diffuser may vary in shape (e.g., round, square, rectangular, hexagonal, or the like) and size, with common dimensions (such as sides of a rectangular (and square in some embodiments)) being in the range of about 6 to 8μ to 1000μ or more in some cases. With a size, shape, and number (based on size and shape of facets and of front/transmission surface of diffuser) of facets defined, the facet defining algorithm uses random selection of the facets for assignment to a brightness beam/set (which may be associated with a particular range of distribution angles of the overall defined light distribution), and the algorithm further uses random assignment of transmission angles within this cell and its distribution angle range (or within a predetermined region) to avoid hotspots (e.g., not every or even any of the facets will be targeted at center of predetermined region).

The light distribution can be defined by user input to achieve nearly any desired light distribution such as for creating a line focus or an engineered diffusion to eliminate hot spots (such as may happen when using LED lights as light sources without use of the present invention). Further, the light distribution may be defined as engineered shapes such as letters or images, and the facets are defined to provide light distributions to present these shapes in space a distance away from the front/transmission surface of the diffuser. Further, the user input may define a direction and/or location of an incoming light stream from a light source, and the algorithm (or diffuser design module) may be configured to manipulate or respond to the direction of the incoming light for a solution the diffuser needs as part of defining the facets for desired light distribution. The program further can be configured to provide the ability to manipulate the facets by changing (via user input or the like) the refractive index of the materials in the program (e.g., one parameter set by the user input may be a diffuser material and/or a refractive index for the substrate/film to be used in forming the diffuser).

The new diffusers may be used with a wide variety of light sources such as LED, fluorescent, laser and halogen lighting or light sources. In one particular implementation, the apparatus with a light diffuser described herein is implemented with an LED light source and is configured for use as or in LED lighting curing units for proper light distribution of curing energy cured inks and coatings for the printing and converting industry. The apparatus in other implementations are used in or to provide projection screens. In other cases, the apparatus includes the new diffusers to provide theater lighting or lighting for film production. In still other examples of useful apparatus with the new diffusers, the apparatus taught herein may take the form of a microdisplay or screen (e.g., an LED screen) of all types (e.g., displays or screens for a PDA, a TV, a smartphone or cellphone, computing devices such as pads, tablets, and the like, or other electronic device with a display or screen). In still other use cases, the new apparatus uses the diffusers for light diffusion in automobile headlights, taillights, and interiors. Other apparatus may include and use the new diffusers for indoor and outdoor lighting applications.

The file defining the diffuser's facets can be used (e.g., to create tooling) for a variety of manufacturing processes. For example, the design file output by the software described herein can be used in a method of manufacture of the diffusers in extrusion processes as well as in a method of manufacture in cast and cure (UV or E Beam) curing of the facets. Further, the design file may be used as input for a method to create larger tooling and seamless tooling due to the use of the random selection processed taught herein.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the light receiving surface of the diffuser (e.g., a back surface which faces the light source) may be configured to include the facets while the front surface may be planar. This reverse orientation compared to that described above is not shown in the figures, but it will be readily understood by those skilled in the arts.

As discussed above, the diffuser and its facets will often be configured for diffusing light of various wave lengths. For example, the facets may be engineered to provide the predefined light distribution (particular scattering or diffusing of light) for white light as well as specific ranges of wavelengths for various applications such as IR, lower wave lengths, and the like In the same or other examples, the design programming can be done for touchless screens and so forth. In other words, the diffusers can be made to work at very specific wavelengths as taught herein and understood by ready extension by those skilled in the arts.

In some embodiments, the diffusers are configured as metallized reflective diffusers, and a thin film or layer of reflective metal is provided upon the planar surface of the diffuser and the output light from the light source first passes through the surface containing the facets prior to reflection with light scattering as described herein. The diffusers described herein may be manufactured in a number of ways as discussed above and further including via molded glass and injection molded plastics processes.

In some embodiments, a diffuser (such as diffuser 120 of FIG. 1 or the diffuser 200 of FIG. 2) is designed and fabricated to include a plurality of lenses on the "back surface" or surface opposite the "front" or facet-containing surface of the diffuser. As discussed above, the facet-containing surface of the substrate or body of the diffuser may be the light transmission surface of the diffuser or may be the light receiving surface of the diffuser, with either arrangement being useful in an apparatus with a multi-faceted diffuser such as apparatus 100 of FIG. 1. For example, it may be useful for the back surface 122 of diffuser 120 to include a plurality of lenses or for the back surface 202 of diffuser 200 to include a plurality of lenses. These lenses can be useful in allowing or creating a wider distribution in the diffuse light (light 140 in FIG. 1 or light 230 in FIG. 2) in one or more axes, which may be highly desirable in some applications.

FIG. 14 is a simplified end view of an apparatus 1400 similar to that shown in FIGS. 1 and 2 but including a plurality of lenses 1415 on a light receiving or back surface 1414 of the substrate or body 1411 of the diffuser 1410. FIG. 15 is an enlarged view 1550 of a portion of the apparatus 1400 of FIG. 14 showing light traveling through the diffuser 1410. In this exemplary apparatus 1400, a light source 1420 is provided that includes a plurality of LEDs 1422 to generate the incoming light (or source light stream(s)) 1560 that is directed onto the back or lens-covered surface 1414 of the substrate 1411. In other implementations of the apparatus 1400, a different configuration for the light source 1420 may be utilized as discussed above to provide the collimated or non-collimated light 1560.

As shown, the light-receiving surface 1414 in this apparatus 1400 is fabricated to include a plurality of lenses 1415 that act to receive and focus or shape the incoming light 1560 that is then transmitted, as shown with arrows 1565, through the substrate or diffuser body 1410 and onto the light-transmitting or "front" surface 1412. The facets 1413 are configured, as discussed in detail above, to diffuse the light through the use of specially configured cells or sets of facets 1413, as is shown with exiting diffuse light 1570. The lenses 1415 typically will be formed of the same material as the facets 1413 and substrate 1410 and often in the same or a similar manner as the facets 1413.

The lenses 1415 may take a wide variety of shapes to practice the apparatus 1400, with round lenses being shown as one useful but non-limiting example. In other cases, the lenses (which are intended to include nearly any optical structure) 1415 may be square, hexagonal, elliptical, pyramid, lenticular, or any other useful configuration to obtain a desired amount of light shaping (e.g., to achieve a desired wider distribution in one or more axis in the diffuse light 1570). As illustrated, the size and number of the lenses 1415 have been chosen to be similar to that of the facets 1413 (e.g., the number and/or an outer dimension of the lenses may match that of the facets or be within a range of plus or minus 10 to 20 percent of the number of facets), but this is not a requirement to implement the apparatus 1400. Lenticular lenses (when used for lenses 1415) would typically be in the range of 15 microns (in chord width) to about 500 microns, and other types of lenses 1415 and optical elements 1413 would often have similar dimensions (or sizes), with a preference in some cases being in the range of 15 to about 100 microns for the elements/facets 1413 and lenses 1415.

Figure 16:
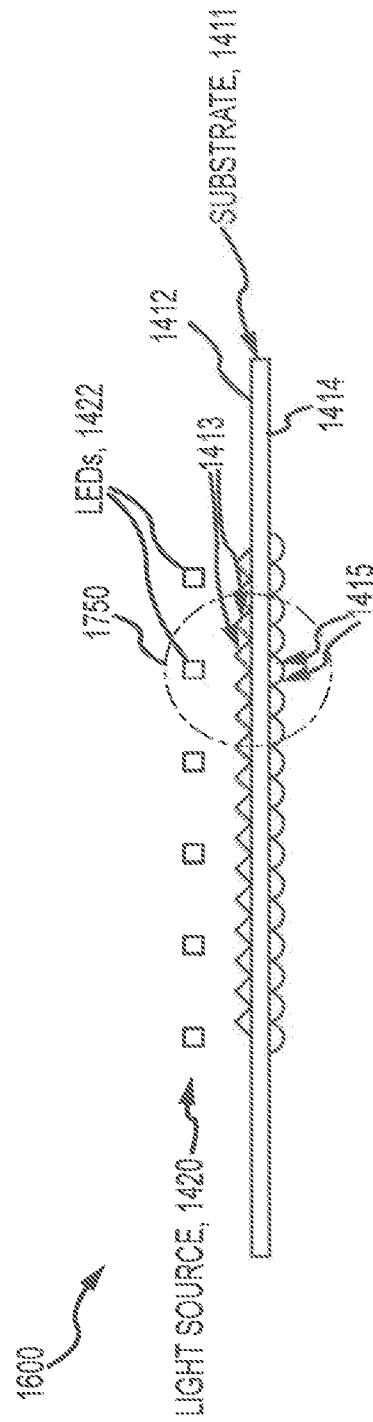
FIG. 16 is a simplified end view of an apparatus similar to that shown in FIG. 14 except with the diffuser oriented with the multi-faceted surface of the diffuser acting as the light receiving surface and with the lens-covered surface acting as the front or light transmitting surface of the diffuser.

FIG. 16 is a simplified end view of an apparatus 1600 similar to that shown in FIG. 14 and using the same configuration for diffuser 1410. However, in apparatus 1600, the diffuser 1410 is oriented with the multi-faceted surface 1412 (or surface of the substrate 1411 with the facets 1413) of the diffuser 1410 acting as the light receiving surface. In the apparatus 1600, the lens-covered surface 1414 (or surface of the substrate 1411 with the lenses 1415) acts as the front or light transmitting surface of the diffuser 1410.

Figure 17:
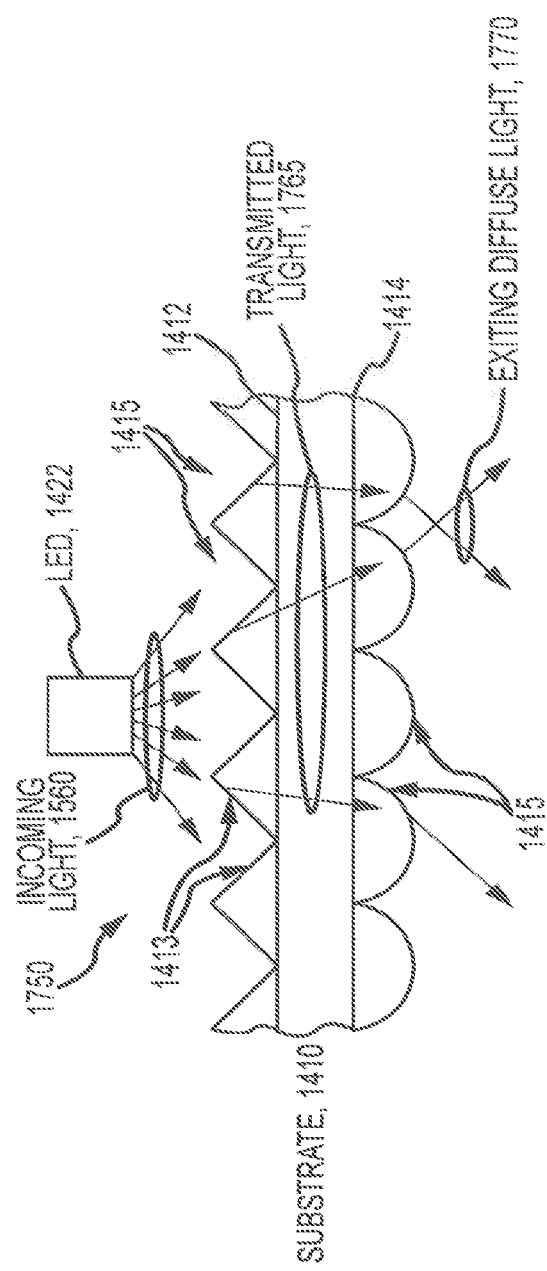
FIG. 17 is an enlarged view of a portion of the apparatus of FIG. 16 showing light traveling through the diffuser.

FIG. 17 is an enlarged view 1750 of a portion of the apparatus 1600 of FIG. 16 showing light traveling through the diffuser 1410. Particularly, the incoming light 1560 from the LEDs 1422 strikes the facets 1413 first and is diffused and transmitted, as shown with arrows 1765, through the body or substrate 1411. This light 1765 then is passed through the lenses 1415 with a desired amount of shaping or focusing as exiting diffuse light 1770.

At this point in the description, it may be useful to provide a brief review or overview of the use of the new diffuser designs to use voxels as light collimating and shaping elements with facets. Then, the description will turn to a short overview of concepts or lessons learned during one diffuser design and manufacture project that has been initiated by the inventors.

In light management, especially with point light sources such as LEDs, it is sometimes desirable to shape light in different ways and also collimate the light and add or reduce brightness to a target. For instance, facets providing voxels can be set at different levels below the lighting element (on the top of the substrate or bottom of the substrate). These facets can be grouped and selected randomly, and a very small area (e.g., less than 1 mm$^2$) can contain several focusing facets creating voxels at different levels. In other words, one laser light shining through the facets can have 3 or more focal lengths in the voxels.

The voxels create points of light at the intersections that then spread at the desired cone angle to the desired area. As the voxels are created deeper below the optical element (longer focal lengths), the resulting cone angles become narrower, resulting in some collimating or narrower angles. The focal lengths or voxels can be weighted with higher numbers of facets in order to increase the brightness level in the resulting cone angle. By doing this, lighting can be shaped per the target in the following working example. Obviously, these sets of facets are randomized together, and the apparatus performs the same without necessary registration to the LED's or lighting. However, by registering the facets, more accurate distributions can be achieved if needed or desired for a particular application.

Focal lengths for the voxels can be from a few microns to several feet. Facets can have a variety of sizes such as from about 15 microns to about 5,000 microns. Facets can be at the top of the substrate or bottom, or both, and facets can be extrusion embossed, injection molded, or cast and cured on the diffuser substrate.

The exemplary diffuser design project initially involved creating two unique diffusion surfaces, which were to feature two different light distributions from an LED-based light source. However, it was determined that highly specific light distribution could only be achieved through registration of the facet array to specific LED source positions. Also, later data showed a symmetrical, regular angular distribution. With this new photometric data in hand and with the understanding by the inventors that it would be preferable to have a system or apparatus that does not require registration, the inventors determined that a new approach would be desirable.

Experimentations and analysis of a lighting apparatus/system showed that the base luminaire or light source includes an LED board or light source with 120° LEDs having off-axis focus and the existing diffusion element was an array of "focusing" Fresnel lenses that primarily focus/collimate (e.g., to a point about 10 mm below the diffusion element). The rays then crossed over to form a cone angle of about 60 degrees. The resulting diffused light has a distribution with a shape that does slightly collimate the light at the top of the luminaire keeping light shaped off the walls and decreasing glare. However, the limitations of the present or original lighting apparatus design include that it does not allow "weighting" of different layers in the Z axis or allow the desired target "flatness" at the bottom of the target.

Figure 18:
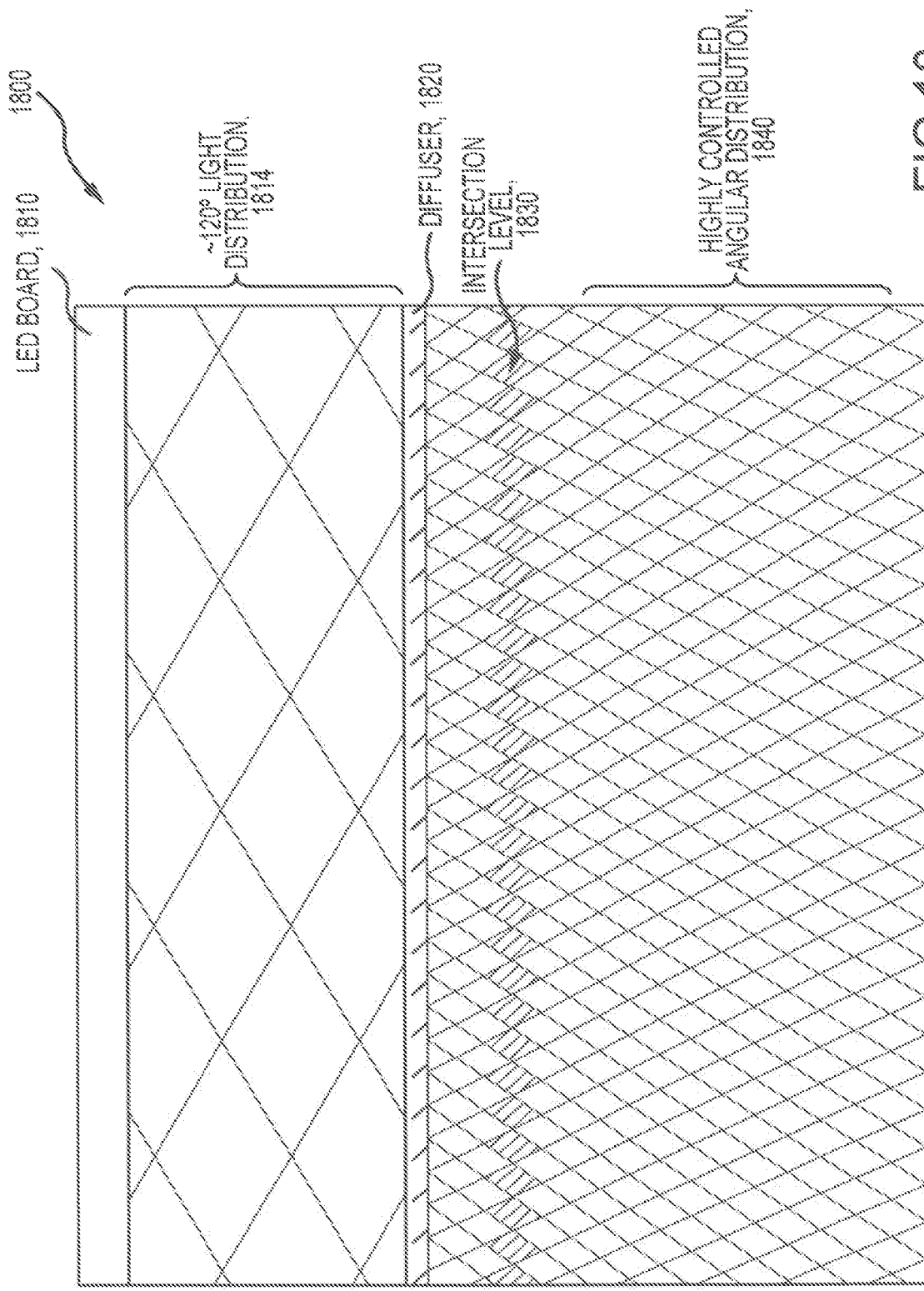
FIG. 18 is a side view of an apparatus, similar to those shown in FIGS. 14-17, designed to provide desired light distribution for a light source.

FIG. 18 is a side view of an apparatus 1800, similar to those shown in FIGS. 14-17, designed to provide desired light distribution for a light source 1810 (an LED board in this non-limiting example). As shown, the apparatus 1800 includes a light source 1810 in the form of a plurality of LEDs that output a 120° light distribution 1814. This light 1814 is received by a diffuser 1820 configured to combine the use of lenses (such as on the back or light receiving surface facing the LED board 1810) with numerous facets (such as on the front or light transmission surface facing away from the LED board 1810). The diffuser 1820 may take the form described above with reference to FIGS. 14 and 15 (or, in some cases, may take the form described above with reference to FIGS. 16 and 17).

Using this diffuser 1820, with lenses and facets as taught herein, allow the apparatus 1800 to operate to achieve a desired target angular distribution as well as providing improvements to the output curve (when compared to the Fresnel lens diffuser discussed above). The new facet array design of the diffuser 1820 combined with the focusing approach provided by the lenses of the diffuser 1820 takes the approximately 120° LED output 1814 and redirects it in a desirable manner as shown with highly-controlled angular distribution 1840. Rays transmitted from the diffuser 1820 intersect at points a distance from the diffuser surface as shown with intersection level 1830 to form voxels resulting in engineered angles of distribution.

FIG. 19 illustrates a ray tracing 1900 of diffusion provided by a small portion of a diffuser 1910 of the present description such as the diffusers shown in FIGS. 14-18. As shown, the diffused or output light 1914 from the diffuser 1910 has multiple intersection points to provide a like number of voxels (e.g., 1 to 3 or more) spaced apart a distance from the light transmission surface of the diffuser 1910. In some embodiments, greater level of control is provided to the user of the design system (e.g., via inputs to the design optimization module) to intelligently or selectively place the multiple intersection points 1918 at desired distances from the diffuser 1910.

Each of the intersection points 1918 may, in this manner, feature unique, user-controllable angular distributions and facet counts by creating multiple voxel focal points below (or a distance away from) the luminaire or light source (not shown but understood at least from FIG. 18). The "voxel" approach is useful in many cases to limit the amount of glare created by a lighting apparatus 1900. In this example, the light source includes LEDs providing incoming 120-degree inputs or light streams. The facets of the diffuser 1910 are mixed and randomized so that in any given area (e.g., a few square millimeters or the like) the facets create multiple voxels or focal points 1918 at different levels per the ray tracing 1900. Each of the voxels 1918 can be weighted as desired by a diffuser designer as discussed above to vary the brightness of each resulting cone angle (which may be set at 45 degrees, 60 degrees, and 90 degrees, for example, or any other desired cone angle, and these may be the same or differ for each of the three voxels 1918).

In the lighting apparatus 1900, three voxels 1918 are shown, but one, two, three, four, or more may be provided to create one, two, three or more layers each with one, two, or more voxels 1918 to achieve a desired diffuser. The width of the set of facets in the diffuser 1910 creating these voxels maybe a pattern less than 0.5 mm and repeating or several be up to 1 cm or more in size. In turn, all of these sets of patterns could be randomized, creating vectors rather than voxels for the same result in light distribution. The facets themselves may or may not be randomized in position so as to avoid unwanted patterning.

The resulting cone angles are different in many applications such as for the voxels 1918 in the lighting apparatus 1900 shown in FIG. 19. For example, as the voxels 1918 get deeper (e.g., further away from the light transmission surface of the diffuser 1910), the resulting cone angles are narrower allowing more light in the center (e.g., 90 degrees for closest voxel 1918, 60 degrees for middle voxel 1918, and 45 degrees for furthest or deepest voxel 1918 in this three-voxel example device 1900). Note, also, that this technology can be used as a collimator, not just diffuser. Further, the facets refracting the light can be weighted so as more light is directed toward chosen cone angles (with a greater weight resulting in more facets of the diffuser 1910 being assigned to that particular voxel 1918).

We claim:
1. An optical diffuser, comprising:
a body formed of a material that is at least translucent to light;
a back surface for receiving output light from a light source and for scattering the output light received on the back surface to provide diffuse light;
a front surface, on the body opposite the back surface on the body, for transmitting the output light scattered by the back surface as diffuse light with a predefined light distribution;
wherein a first one of the back and front surfaces comprises a plurality of facets each having a planar face;
wherein each of the plurality of facets is randomly assigned to one of a plurality of sets, wherein each of the plurality of sets is associated with a region of the predefined light distribution, wherein a brightness value is assigned to each of the sets;
wherein each of the sets of the facets is associated with a brightness cell defining a predefined light distribution, wherein a number of the facets assigned to each of the sets of the facets is selected based on a brightness values assigned to each of the brightness cells; and
wherein at least one set of the facets are configured to generate a voxel at a predefined distance from the front surface to transmit a portion of the diffuse light at a predefined cone angle.

2. The optical diffuser of claim 1, wherein a second set of the facets are configured to generate a second voxel at a second predefined distance from the front surface to transmit a second portion of the diffuse light at a second predefined cone angle.

3. The optical diffuser of claim 2, wherein the second predefined distance is greater than the predefined distance and wherein the second predefined cone angle differs from the predefined cone angle.

4. The optical diffuser of claim 2, wherein the second set of the facets providing the second voxel has a greater number of the facets than the set of the facets providing the voxel, whereby the second portion of the diffuse light has a greater brightness than the portion of the diffuse light.

5. The optical diffuser of claim 1, wherein a second one of the back and front surfaces comprises a plurality of lenses and wherein each of the planar faces has a maximum outer dimension in a range of 6 to 350 microns.

* * * * *